(12) United States Patent
Gere

(10) Patent No.: US 9,507,198 B2
(45) Date of Patent: Nov. 29, 2016

(54) SYSTEMS AND METHODS FOR ELECTRONICALLY CONTROLLING THE VIEWING ANGLE OF A DISPLAY

(75) Inventor: David S. Gere, Palo Alto, CA (US)

(73) Assignee: APPLE INC., Cupertino, CA (US)

(*) Notice: Subject to any disclaimer, the term of this patent is extended or adjusted under 35 U.S.C. 154(b) by 726 days.

(21) Appl. No.: 12/622,268

(22) Filed: Nov. 19, 2009

(65) Prior Publication Data

US 2011/0116017 A1    May 19, 2011

(51) Int. Cl.
  *G02F 1/1335*    (2006.01)
  *G02F 1/13*    (2006.01)
  *G02F 1/29*    (2006.01)

(52) U.S. Cl.
  CPC ....... *G02F 1/133504* (2013.01); *G02F 1/1323* (2013.01); *G02F 1/292* (2013.01)

(58) Field of Classification Search
  CPC ................. G02F 1/292; G02F 1/1323; G02F 1/133504; G02F 1/13471; G02F 1/1347; G02F 1/31; G02F 2001/311; G02F 2201/305; G02B 27/2228; G02B 27/4272; G02B 26/0808
  USPC .............. 349/73, 74, 196, 197, 201, 202, 15
  See application file for complete search history.

(56) References Cited

U.S. PATENT DOCUMENTS

| | | | |
|---|---|---|---|
| 5,838,416 A | 11/1998 | Chen et al. | |
| 5,877,829 A | 3/1999 | Okamoto et al. | |
| 5,956,107 A | 9/1999 | Hashimoto et al. | |
| 6,101,008 A * | 8/2000 | Popovich | 359/15 |
| 6,665,100 B1 * | 12/2003 | Klug et al. | 359/23 |
| 7,542,109 B2 | 6/2009 | Jang et al. | |
| 7,551,239 B2 | 6/2009 | Fukushima et al. | |
| 2002/0047837 A1 * | 4/2002 | Suyama et al. | 345/204 |
| 2005/0259193 A1 | 11/2005 | Sumiyoshi et al. | |
| 2006/0176417 A1 * | 8/2006 | Wu et al. | 349/58 |
| 2007/0046855 A1 * | 3/2007 | Choi et al. | 349/58 |
| 2007/0109481 A1 | 5/2007 | Mimura et al. | |
| 2008/0284715 A1 * | 11/2008 | Kawata | 345/102 |
| 2010/0026920 A1 * | 2/2010 | Kim et al. | 349/15 |
| 2010/0315414 A1 * | 12/2010 | Lowe | 345/419 |

FOREIGN PATENT DOCUMENTS

| | | | | |
|---|---|---|---|---|
| CN | 101329475 | 12/2008 | | |
| JP | 05072529 A * | 3/1993 | .......... | G02F 1/1335 |
| TW | 574573 | 2/2004 | | |
| TW | 200600923 | 1/2006 | | |
| TW | 200602754 | 1/2006 | | |
| TW | 200617517 | 6/2006 | | |

* cited by examiner

*Primary Examiner* — Jessica M Merlin
(74) *Attorney, Agent, or Firm* — Van Court & Aldridge LLP

(57) ABSTRACT

Systems and methods for electronically controlling the viewing angle of a display using liquid crystal optical elements are provided. Each liquid crystal optical element may be associated with a respective scattering module and may selectively steer a device generated light beam to one of two or more scattering regions of its associated scattering module. When a scattering region receives a steered light beam, the steered light beam may be scattered into a viewing cone having at least one viewing angle defined by a characteristic of that scatter region. Each liquid crystal optical element may be made from one or more suitable liquid crystal materials that can be controlled electronically to vary the effective index of refraction of one or more different regions of the liquid crystal optical element, thereby steering incoming light towards a particular one of two or more scattering regions of an associated scattering module.

13 Claims, 9 Drawing Sheets

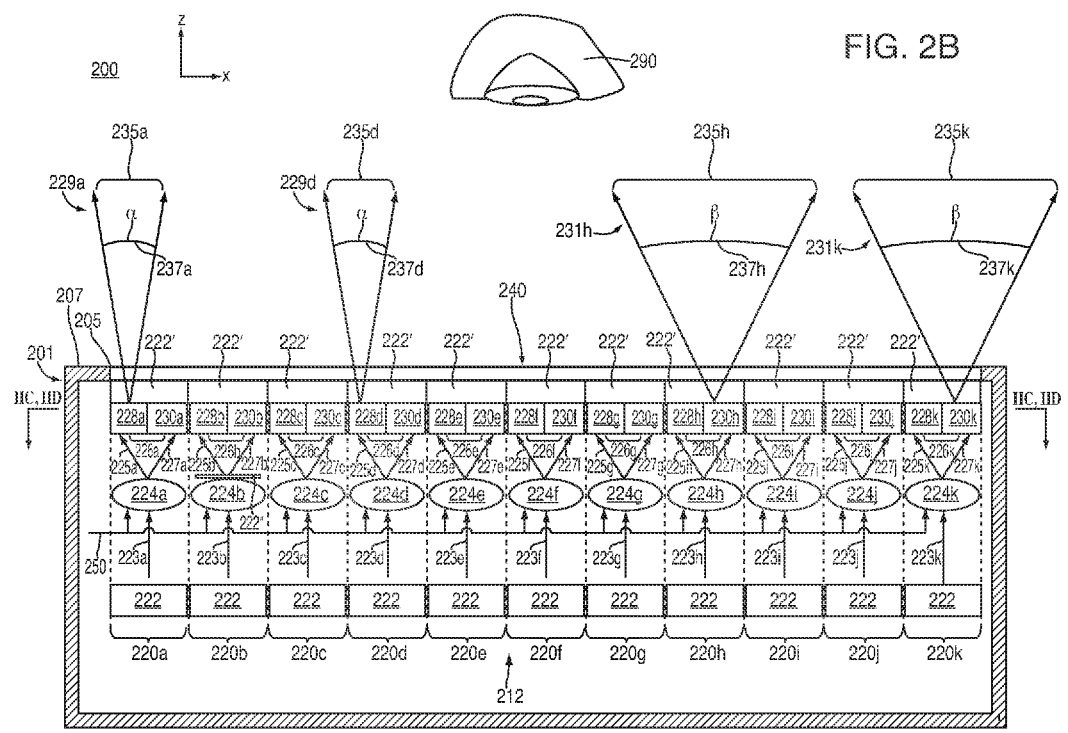

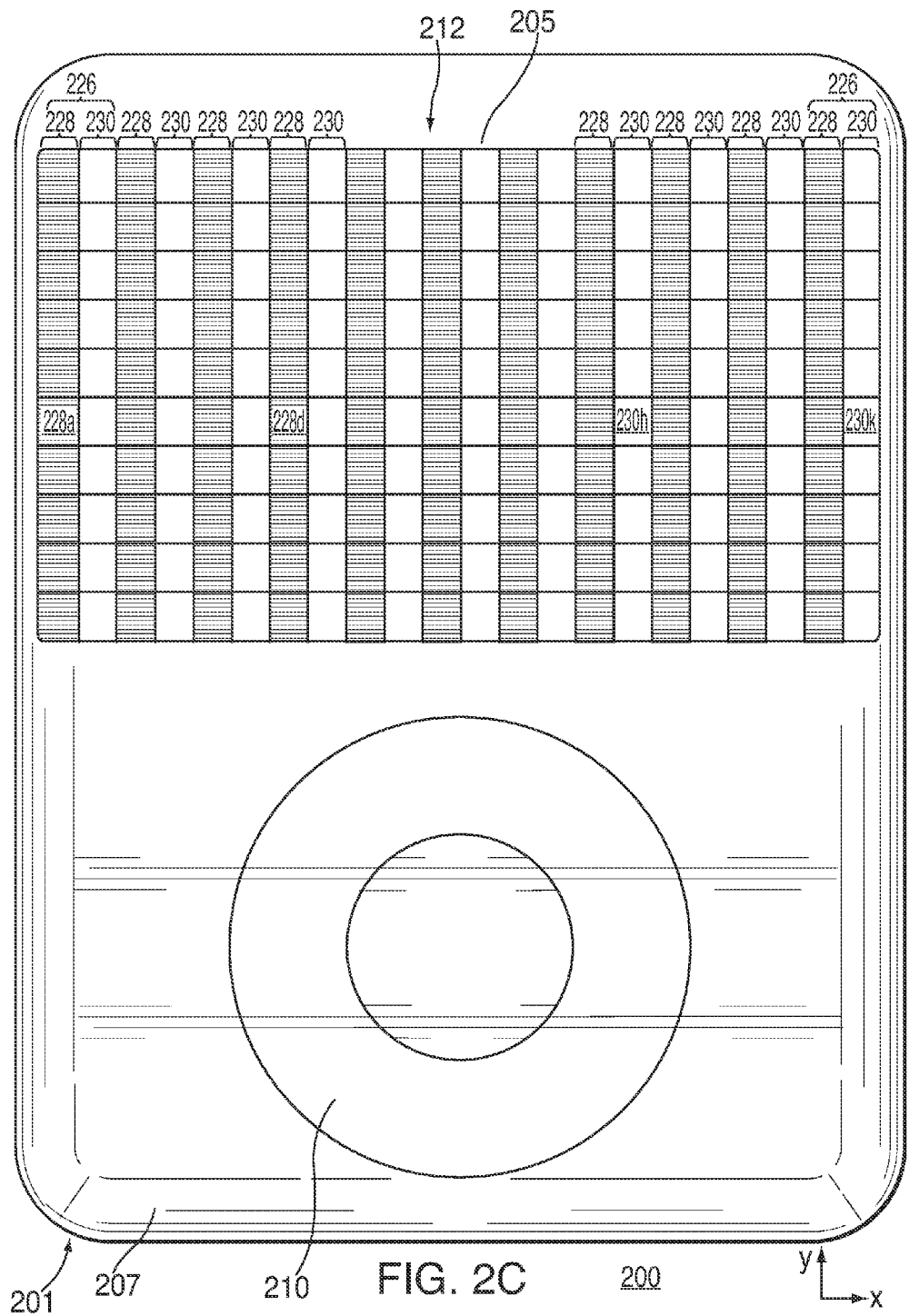

SYSTEMS AND METHODS FOR ELECTRONICALLY CONTROLLING THE VIEWING ANGLE OF A DISPLAY

FIELD OF THE INVENTION

This can relate to systems and methods for controlling the viewing angle of a display and, more particularly, to systems and methods for electronically controlling the viewing angle of a display using liquid crystal optical elements.

BACKGROUND OF THE DISCLOSURE

Many electronic devices include the ability to present visible information to a user. In particular, many cellular telephones, laptop computers, and other portable electronic devices include a display screen for projecting light beams representative of device generated information to one or more viewers. Often, a user of the device may choose to share this displayed information with others looking at the device from various angles with respect to the screen, while, in other situations, the user may only want a person positioned directly in front of the screen to be able to see the displayed information. However, due to processing limitations, display limitations, size limitations, and other limitations of such electronic devices, a user must generally shield the display screen away from unintended viewers or aim the display screen towards only an intended viewer.

SUMMARY OF THE DISCLOSURE

Systems and methods for electronically controlling the viewing angle of a display screen are provided.

For example, in some embodiments, there is provided an electronic device that may include a housing having an opening through a portion of the housing, a light source that directs light towards the opening, and a first display control subassembly. The first display control subassembly may include a scattering module positioned between the light source and the opening. The scattering module may include a plurality of scattering regions. The first display control subassembly may also include a steering module positioned between the light source and the scattering module. The steering module may include a liquid crystal material that is electronically controllable to direct a light beam from the light source towards a particular scattering region of the plurality of scattering regions.

The plurality of scattering regions may include a first scattering region that scatters light from the steering module towards the opening with a first viewing angle with respect to a first axis, and a second scattering region that scatters light from the steering module towards the opening with a second viewing angle with respect to the first axis. The second viewing angle may be different than the first viewing angle. In some embodiments, the steering module may include a linear electric field gradient across the liquid crystal material. In other embodiments, the steering module may include a radial electric field gradient across the liquid crystal material. The liquid crystal material may be electronically controllable to adjust an effective index of refraction of the steering module or to adjust a focal length of the steering module In other embodiments, there is provided a method for controlling a viewing angle of a display having a first scattering region with first scattering properties and a second scattering region with second scattering properties. The method may include directing a light beam towards a liquid crystal material and steering the light beam from the liquid crystal material towards a particular scattering region of the first scattering region and the second scattering region. The steering may include applying a variable electrical control signal to the liquid crystal material. For example, the steering may also include adjusting an effective index of refraction of the liquid crystal material using the applied control signal or adjusting a focal length of the liquid crystal material using the applied control signal. In some embodiments, the method may also include adjusting the brightness of the light beam based on the scattering properties of the particular scattering region. Moreover, in some embodiments, the steering may not include any mechanical movement of the liquid crystal material.

BRIEF DESCRIPTION OF THE DRAWINGS

The above and other aspects of the invention, its nature, and various features will become more apparent upon consideration of the following detailed description, taken in conjunction with the accompanying drawings, in which like reference characters refer to like parts throughout, and in which:

FIG. 2B is a horizontal cross-sectional view of a portion of the electronic device and display assembly of FIG. 2A, taken from line IIB-IIB of FIG. 2A, in accordance with some embodiments of the invention;

FIG. 2C is a top view of the electronic device and display assembly of FIGS. 2A and 2B, taken from line IIC-IIC of FIG. 2B, in accordance with some embodiments of the invention;

DETAILED DESCRIPTION OF THE DISCLOSURE

Systems and methods for electronically controlling the viewing angle of a display screen are provided and described with reference to FIGS. 1-6.

An electronic device may be operative to provide visible information to a user. For example, an electronic device may include a display assembly operative to present the visible information at various viewing angles. The display may be provided with one or more steering modules, each of which may be associated with a respective scattering module having two or more scattering regions. Each steering module may selectively steer a device generated light beam to one of the scattering regions of its associated scattering module. When a scattering region receives a steered light beam, the steered light beam may be scattered into a viewing cone having at least one viewing angle that may be at least partially defined by a characteristic of that scattering region. Therefore, the particular scattering region of a scattering module towards which a steering module steers a device generated light beam may determine a viewing angle of light provided by the display to the user.

In some embodiments, each steering module may include one or more liquid crystal optical elements, which may be made from one or more suitable liquid crystal materials. The optical properties of the liquid crystal materials can be controlled electronically. This electronic control may allow the effective index of refraction of one or more different regions of the liquid crystal optical elements to be varied, thereby steering incoming light towards a particular one of two or more scattering regions of an associated scattering module.

Figure 1:
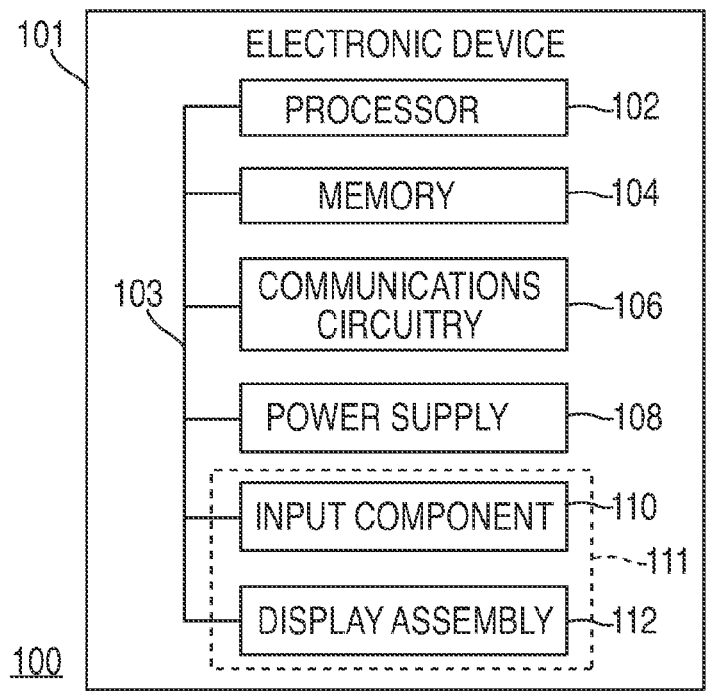
FIG. 1 is a schematic view of an illustrative electronic device in accordance with some embodiments of the invention.

FIG. 1 is a schematic view of an illustrative electronic device 100 for displaying visible information to a user. Electronic device 100 may be any portable, mobile, or hand-held electronic device configured to present visible information on a display assembly wherever the user travels. Alternatively, electronic device 100 may not be portable at all, but may instead be generally stationary. Electronic device 100 can include, but is not limited to, a music player, video player, still image player, game player, other media player, music recorder, movie or video camera or recorder, still camera, other media recorder, radio, medical equipment, domestic appliance, transportation vehicle instrument, musical instrument, calculator, cellular telephone, other wireless communication device, personal digital assistant, remote control, pager, computer (e.g., desktop, laptop, tablet, server, etc.), monitor, television, stereo equipment, set up box, set-top box, boom box, modem, router, keyboard, mouse, speaker, printer, and combinations thereof. In some embodiments, electronic device 100 may perform a single function (e.g., a device dedicated to displaying image content) and, in other embodiments, electronic device 100 may perform multiple functions (e.g., a device that displays image content, plays music, and receives and transmits telephone calls).

Electronic device 100 may include a processor or control circuitry 102, memory 104, communications circuitry 106, power supply 108, input component 110, and display assembly 112. Electronic device 100 may also include a bus 103 that may provide a data transfer path for transferring data and/or power, to, from, or between various other components of device 100. In some embodiments, one or more components of electronic device 100 may be combined or omitted. Moreover, electronic device 100 may include other components not combined or included in FIG. 1. For example, electronic device 100 may include motion detection circuitry, light sensing circuitry, positioning circuitry, or several instances of the components shown in FIG. 1. For the sake of simplicity, only one of each of the components is shown in FIG. 1.

Memory 104 may include one or more storage mediums, including for example, a hard-drive, flash memory, permanent memory such as read-only memory ("ROM"), semi-permanent memory such as random access memory ("RAM"), any other suitable type of storage component, or any combination thereof. Memory 104 may include cache memory, which may be one or more different types of memory used for temporarily storing data for electronic device applications. Memory 104 may store media data (e.g., music, image, and video files), software (e.g., for implementing functions on device 100), firmware, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable device 100 to establish a wireless connection), subscription information (e.g., information that keeps track of podcasts or television shows or other media a user subscribes to), contact information (e.g., telephone numbers and e-mail addresses), calendar information, any other suitable data, or any combination thereof.

Communications circuitry 106 may be provided to allow device 100 to communicate with one or more other electronic devices or servers using any suitable communications protocol. For example, communications circuitry 106 may support Wi-Fi™ (e.g., an 802.11 protocol), Ethernet, Bluetooth™, high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), hypertext transfer protocol ("HTTP"), BitTorrent™, file transfer protocol ("FTP"), real-time transport protocol ("RTP"), real-time streaming protocol ("RTSP"), secure shell protocol ("SSH"), any other communications protocol, or any combination thereof. Communications circuitry 106 may also include circuitry that can enable device 100 to be electrically coupled to another device (e.g., a computer or an accessory device) and communicate with that other device, either wirelessly or via a wired connection.

Power supply 108 may provide power to one or more of the components of device 100. In some embodiments, power supply 108 can be coupled to a power grid (e.g., when device 100 is not a portable device, such as a desktop computer). In some embodiments, power supply 108 can include one or more batteries for providing power (e.g., when device 100 is a portable device, such as a cellular telephone). As another example, power supply 108 can be configured to generate power from a natural source (e.g., solar power using one or more solar cells).

One or more input components 110 may be provided to permit a user to interact or interface with device 100. For example, input component 110 can take a variety of forms, including, but not limited to, a track pad, dial, click wheel, scroll wheel, touch screen, one or more buttons (e.g., a keyboard), mouse, joy stick, track ball, and combinations thereof. For example, input component 110 may include a multi-touch screen. Each input component 110 can be configured to provide one or more dedicated control functions for making selections or issuing commands associated with operating device 100.

Electronic device 100 may also include one or more output components that may present information (e.g., textual, graphical, audible, and/or tactile information) to a user of device 100. An output component of electronic device 100 may take various forms, including, but not limited to, audio speakers, headphones, audio line-outs, visual displays, antennas, infrared ports, rumblers, vibrators, or combinations thereof.

For example, electronic device 100 may include display assembly 112 as an output component. Display 112 may include any suitable type of display or interface for presenting visible information to a user of device 100. In some embodiments, display 112 may include a display embedded in device 100 or coupled to device 100 (e.g., a removable display). Display 112 may include, for example, a liquid crystal display ("LCD"), a light emitting diode ("LED") display, an organic light-emitting diode ("OLED") display, a surface-conduction electron-emitter display ("SED"), a carbon nanotube display, a nanocrystal display, any other suitable type of display, or combination thereof. Alternatively, display 112 can include a movable display or a projecting system for providing a display of content on a surface remote from electronic device 100, such as, for example, a video projector, a head-up display, or a three-dimensional (e.g., holographic) display. As another example, display 112 may include a digital or mechanical viewfinder. In some embodiments, display 112 may include a viewfinder of the type found in compact digital cameras, reflex cameras, or any other suitable still or video camera.

It should be noted that one or more input components and one or more output components may sometimes be referred to collectively as an I/O interface (e.g., input component 110 and display 112 as I/O interface 111). It should also be noted that input component 110 and display 112 may sometimes be a single I/O component, such as a touch screen that may receive input information through a user's touch of a display screen and that may also provide visual information to a user via that same display screen.

Processor 102 of device 100 may control the operation of many functions and other circuitry provided by device 100. For example, processor 102 may receive input signals from input component 110 and/or drive output signals to display assembly 112. Processor 102 may load a user interface program (e.g., a program stored in memory 104 or another device or server) to determine how instructions or data received via an input component 110 may manipulate the way in which information is provided to the user via an output component (e.g., display 112). For example, processor 102 may control the viewing angle of the visible information presented to the user by display 112 or may otherwise instruct display 112 to alter the viewing angle.

Electronic device 100 may also be provided with a housing 101 that may at least partially enclose one or more of the components of device 100 for protecting them from debris and other degrading forces external to device 100. In some embodiments, one or more of the components may be provided within its own housing (e.g., input component 110 may be an independent keyboard or mouse within its own housing that may wirelessly or through a wire communicate with processor 102, which may be provided within its own housing).

Figure 2A:
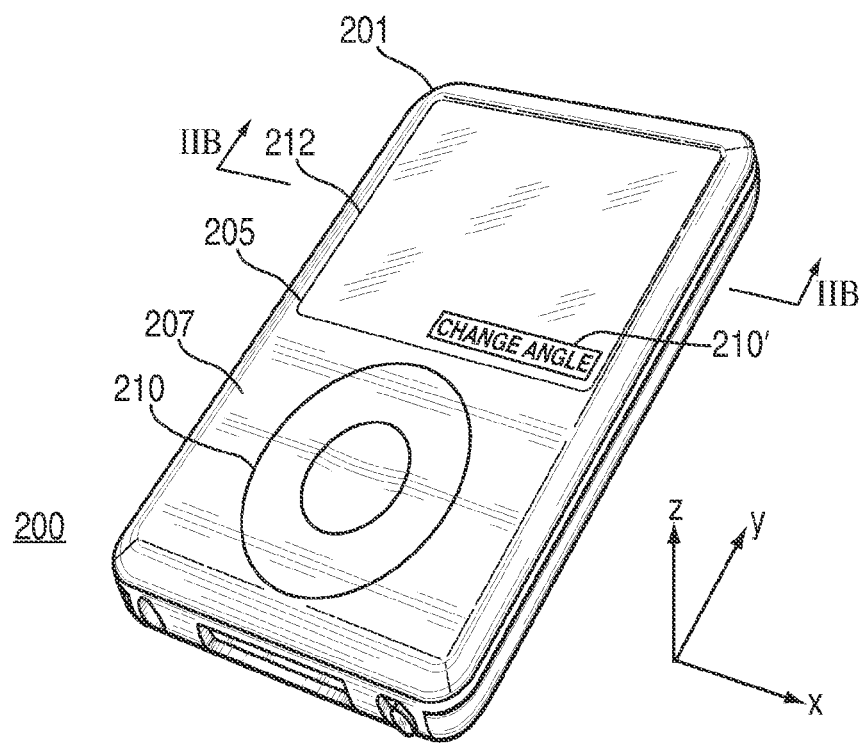
FIG. 2A is an isometric view of an illustrative electronic device with a display assembly in accordance with some embodiments of the invention.

FIGS. 2A-2D show an illustrative electronic device 200. Electronic device 200 may include some or all of the features of electronic device 100 of FIG. 1. In particular, as shown in FIG. 2A, for example, electronic device 200 may include a display assembly 212 positioned at an opening 205 through a wall 207 of housing 201 of device 200. In some embodiments, display 212 may be a touch screen and may also act as an input component for device 200. Therefore, display 212 may provide an input region (e.g., input region 210') on a portion of display 212 that may receive a user touch event for instructing device 200 (e.g., an instruction to alter the viewing angle or other characteristic of display 212). In other embodiments, electronic device 200 may include an additional input component (e.g., input component 210), which may be distinct from display 212, and which may be used to receive user inputs for instructing device 200 (e.g., an instruction to alter the viewing angle or other characteristic of display 212).

The viewing angle of a display may be the maximum angle in the entire range of angles an observer may make between their line of sight and a particular point on the face of the display exposed to the observer within a particular plane while being able to see an acceptably bright image. Light beams projected from a point of the display may provide a viewing cone that may be defined by at least one specific viewing angle.

FIG. 2B is a horizontal cross-sectional view of a portion of electronic device 200 according to some embodiments. As shown in FIG. 2B, display assembly 212 may include an array of display subassemblies 220 (e.g., an array including display subassemblies 220a-220k). Each display subassembly 220 may include a respective image generating module 222, a respective beam steering module 224, and a respective beam scattering module 226. As shown, each scattering module 226 may include two or more scattering regions (e.g., at least a first scattering region 228 and a second scattering region 230).

Image generating module 222 of each display subassembly 220 may direct a generated beam of light 223 towards a respective beam steering module 224 of that display subassembly 220. Beam steering module 224 of each display subassembly 220 may receive the generated beam 223 from its respective image generating module 222 and may steer that beam 223 towards one of the scattering regions of the respective scattering module 226 of that display subassembly 220. For example, as shown in FIG. 2B, each beam steering module 224 may steer a received beam 223 towards either first scattering region 228 as a first steered beam 225 or towards second scattering region 230 as a second steered beam 227. Each one of the beams that may be steered by a beam steering module 224 (e.g., steered beams 225 and 227) may be substantially identical to the generated beam 223 received at that steering module 224 from its respective image generating module 222.

In some embodiments, each steering module 224 may include one or more liquid crystal optical elements, which may be made from one or more suitable liquid crystal materials. The optical properties of the one or more liquid crystal materials may be controlled electronically. For example, as shown in FIG. 2B, at least one control signal line 250 may be coupled to each steering module 224 of display 212 for providing at least one variable voltage or other electrical signal, which may be controlled by a processor or other component of device 200, to vary the optical properties of each steering module 224. This electronic control may vary the effective index of refraction of one or more different regions of the one or more liquid crystal optical elements of each steering module 224, thereby steering incoming light towards a scattering region of an associated scattering module 226. For example, a liquid crystal optical element of steering module 224 may include one or more crystals that may be rotated within a fluid in response to the electrical signal applied to the steering module. Such rotation may affect the effective index of refraction of steering module 224 (e.g., the index of refraction with respect to the direction of an incoming light beam 223).

While only one control signal line 250 is shown in FIG. 2B as being coupled to all of the steering modules 224 of display 212 for controlling all steering modules 224 at the same time with the same control signal, for example, it is to be understood that, in other embodiments, each steering module 224 may be coupled to and independently controlled by its own control signal line 250 that may provide one or more control signals within one or more ranges of values.

Each liquid crystal optical element of each steering module 224 may function as an optical "wedge," such that a linear gradient in the index of refraction of the element may provide a "beam steering" effect. In conventional geometric optics, the geometric shape of a "wedge" element may change the direction of a beam of light transiting through the wedge, such that the angle of the wedge with respect to the beam of light entering the wedge may control the angular change in direction of the beam as it exits the wedge. However, in some embodiments, a liquid crystal optical element may provide a "wedge angle" controllable by a variable control voltage applied to the liquid crystal optical element, such that light beams may be "steered" dynamically under electronic control, for example, without mechanical movement of the beam steering module itself. Thus, the "steering" effect achieved by the liquid crystal optical element may be an electronically controllable change in the direction of beam propagation.

Once a steered beam is received at one of the scattering regions of an associated scattering module 226, the scattering region may scatter the steered beam into a viewing cone 235 that may be defined by at least one viewing angle 237. Each viewing angle 237 that may at least partially define a viewing cone 235 may be dictated by one or more properties of the particular scattering region from which it was scattered. For example, one or more scattering regions of a scattering module 226 (e.g., first scattering region 228 and/or second scattering region 230) may include different scattering properties than each of the one or more other scattering regions of that scattering module 226. In some embodiments, one or more scattering regions of a scattering module 226 may be an opal glass or any other suitable material having a particular type of diffusion powder or other suitable material therein for scattering incoming light into a viewing cone 235 with at least one particular viewing angle 237. Alternatively or additionally, one or more scattering regions of a scattering module 226 may include a transparent material or any other suitable material having an engineered texture for providing a particular surface profile or roughness for scattering incoming light into a viewing cone 235 with at least one particular viewing angle 237. In some embodiments, for example, one or more scattering regions of a scattering module 226 may be provided with a holographic optical material, such as holographic optical material made available by Physical Optics Corporation of Torrance, Calif., which may scatter incoming light into a viewing cone 235 defined by at least two different viewing angles 237 (e.g., a horizontal viewing angle and a vertical viewing angle).

As shown in FIG. 2B, for example, when beam steering module 224a of display subassembly 220a steers generated beam 223a towards first scattering region 228a of scattering module 226a as a first steered beam 225a, first scattering region 228a may scatter steered beam 225a as a scattered beam 229a away from display 212 (e.g., through opening 205, towards a user 290 of device 200) into a viewing cone 235a having a viewing angle 237a of angle size α with respect to the X-axis. In some embodiments, each scattering module 226 of display assembly 212 may include a first scattering region 228 having similar scattering properties to each of the other first scattering regions 228 of display assembly 212. For example, when beam steering module 224d of display subassembly 220d steers generated beam 223d towards first scattering region 228d of scattering module 226d as a first steered beam 225d, first scattering region 228d may scatter steered beam 225d as a scattered beam 229d away from display 212 into a viewing cone 235d having a viewing angle 237d of the same angle size α as that of viewing angle 237a of viewing cone 235a. Although not shown in FIG. 2B, for the sake of clarity, the same may be true for each of the other subassemblies 220 (e.g., subassemblies 220b, 220c, and 220e-220k), when its respective steering module 224 steers a steered beam 225 towards its first scattering region 228.

However, each scattering module 226 may also include at least a second scattering region 230 having scattering properties different from that of its first scattering region 228. For example, as also shown in FIG. 2B, when beam steering module 224h of display subassembly 220h steers generated beam 223h towards second scattering region 230h of scattering module 226h as a second steered beam 227h, second scattering region 230h may scatter steered beam 227h as a scattered beam 231h away from display 212 (e.g., towards a user 290 of device 200) into a viewing cone 235h having a viewing angle 237h of angle size β with respect to the X-axis. Angle size β may be any suitable viewing angle size that is larger or smaller than viewing angle size α. In some embodiments, each scattering module 226 of display assembly 212 may include a second scattering region 230 having similar scattering properties to each of the other second scattering regions 230 of display assembly 212. For example, when beam steering module 224k of display subassembly 220k steers generated beam 223k towards second scattering region 230k of scattering module 226k as a second steered beam 227k, second scattering region 230k may scatter steered beam 227k as a scattered beam 231k away from display 212 into a viewing cone 235k having a viewing angle 237k of the same angle size β as that of viewing cone 235h. Although not shown in FIG. 2B, for the sake of clarity, the same may be true for each of the other subassemblies 220 (e.g., subassemblies 220a-220g, 220i, and 220j), when its respective steering module 224 steers a steered beam 227 towards its second scattering region 230.

In some embodiments, the beam steering module 224 of every subassembly 220 may be operative to steer beams to its respective first scattering region 228 or to its respective second scattering region 230 at a particular moment, which may provide a consistent viewing angle across the array of subassemblies 220 (e.g., when one control signal line 250 is coupled to and controls all steering modules 226 of display assembly 212). In other embodiments, the beam steering module 224 of some subassemblies 220 may be operative to steer beams to its respective first scattering region 228 while the beam steering module 224 of other subassemblies 220 may be operative to steer beams to its respective second scattering region 230 at a particular moment, which may provide different viewing angles at different portions of the array of subassemblies 220 (e.g., when certain steering modules 226 of display assembly 212 are coupled to and controlled by a first control signal line 250 and when other steering modules 226 are coupled to and controlled by a second control signal line 250 that is independent from the first control signal line 250).

Figure 2D:
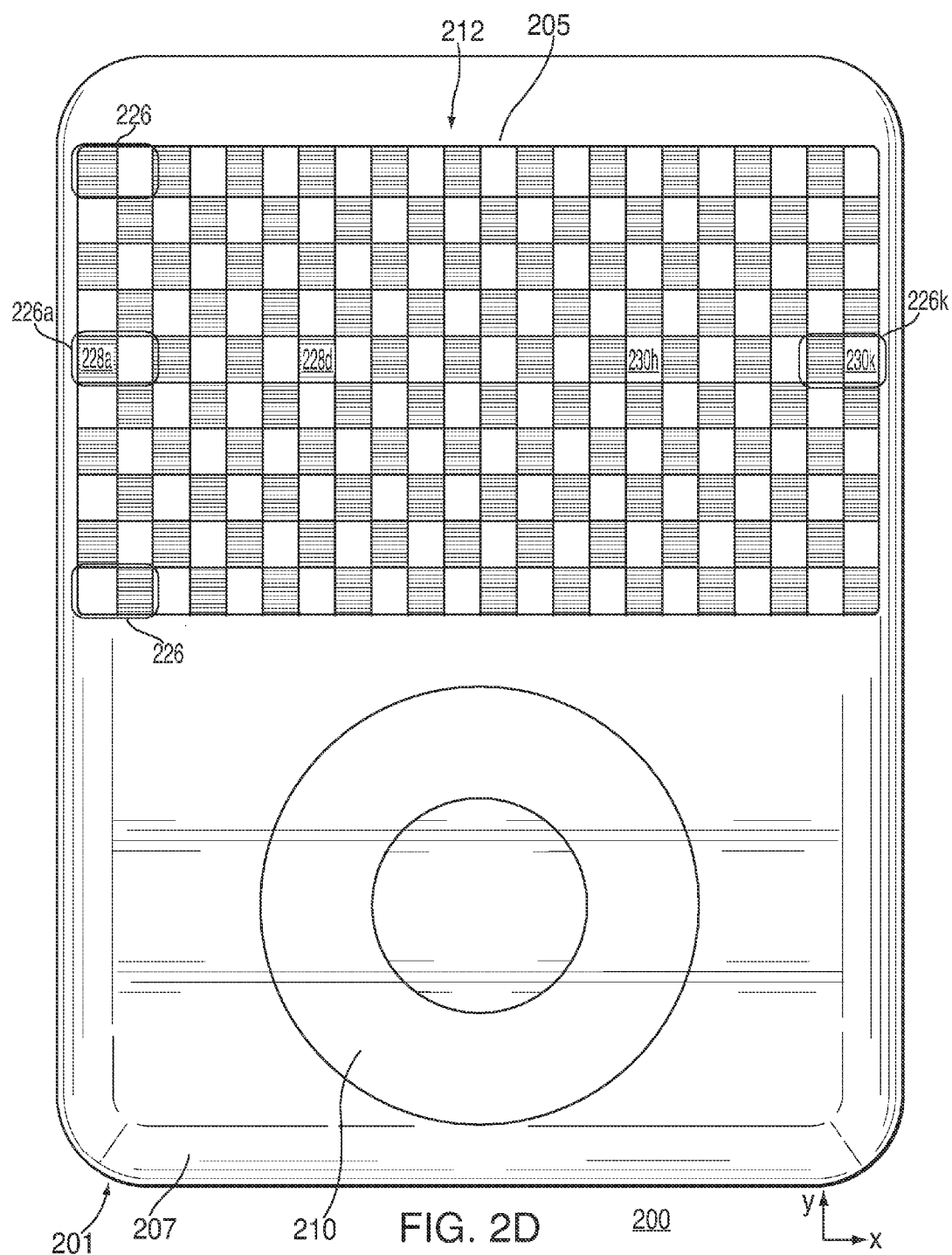
FIG. 2D is a top view of the electronic device and display assembly of FIGS. 2A and 2B, taken from line IID-IID of FIG. 2B, in accordance with some other embodiments of the invention.

Display subassemblies 220 of display 212 may be positioned adjacent one another and may be arranged to form an array of one or more rows and one or more columns of subassemblies 220 under housing opening 205. For example, as shown in the embodiments of FIGS. 2C and 2D, subassemblies 220 may be arranged to form an array of ten rows and eleven columns under housing opening 205 (e.g., respectively along the X-axis and the Y-axis), although it is to be understood that any suitable number of rows and columns may be used depending on the size and resolution of the display, for example. The various scattering regions of scattering modules 226 of display 212 may be arranged in any suitable pattern in the array of subassemblies 220.

In some embodiments, as shown in FIG. 2C, for example, subassemblies 220 may be arranged such that similar scattering regions from each scattering module may align in a linear fashion. For example, first scattering regions 228 of two adjacent scattering modules 226 may be adjacent one another and may align within a row or column of the array of subassemblies 220, and second scattering regions 230 of two adjacent scattering modules 226 may likewise be adjacent one another and may align within a row or column of the array of subassemblies 220. In other embodiments, as shown in FIG. 2D, for example, subassemblies 220 may be arranged such that similar scattering regions from each scattering module may alternate between rows and columns of the subassembly array in a checkerboard or other suitable pattern. For example, first scattering regions 228 of any two adjacent scattering modules 226 in the same row or column may be separated from one another by a second scattering region 230 of one of the adjacent scattering modules 226 of the array of subassemblies 220. Alternatively, subassemblies 220 may be staggered or positioned in any other suitable arrangement under housing opening 205.

While each scattering module 226 is shown in FIGS. 2B-2D as having only two scattering regions (i.e., first scattering region 228 and second scattering region 230), it is to be understood that in other embodiments each scattering module may include three or more scattering regions. For example, rather than including only two scattering regions positioned adjacent one another (e.g., first scattering region 228 and second scattering region 230 aligned adjacent one another along the X-axis, as shown in FIGS. 2B-2D), a scattering module 226 may include three or more scattering regions positioned adjacent one another along a particular axis. In such embodiments, an associated steering module 224 may be operative to steer an incoming beam (e.g., beam 223) towards any one of those three or more adjacent scattering regions in response to one or more electronic control signals provided by at least one control signal line 250. For example, different ranges of control signal values may control a steering module 224 to steer an incoming beam to respective different scattering regions.

Figure 3:
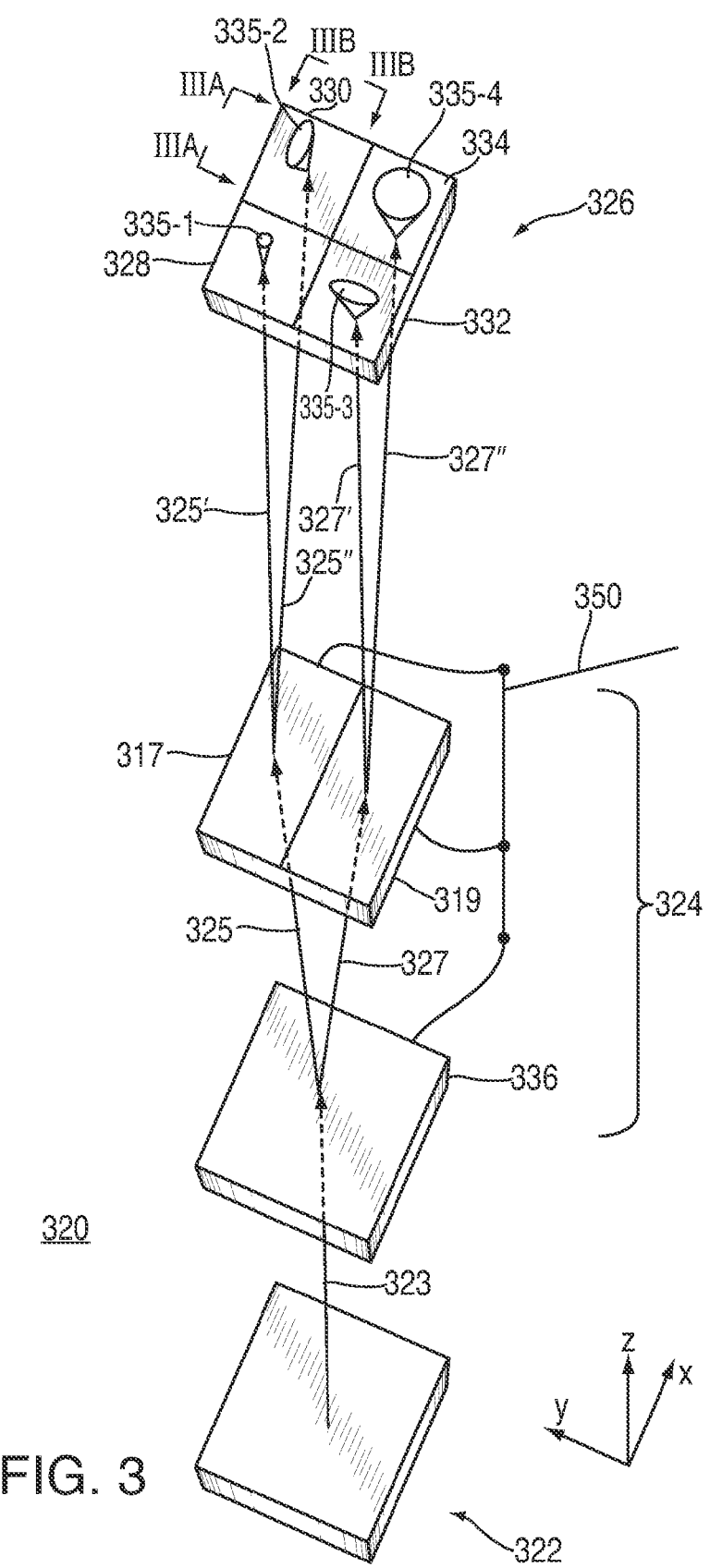
FIG. 3 is an isometric view of a display subassembly in accordance with some embodiments of the invention.

In other embodiments, rather than including two or more scattering regions positioned adjacent one another along a particular axis (e.g., first scattering region 228 and second scattering region 230 aligned adjacent one another along the X-axis, as shown in FIGS. 2B-2D), a scattering module may include three or more scattering regions positioned in a non-linear fashion. For example, as shown in FIG. 3, a display subassembly 320, which may be substantially similar to display subassemblies 220 of FIGS. 2B-2D, may include a scattering module 326 having three or more scattering regions arranged in a two-dimensional array. Scattering module 326 may include four scattering regions 328, 330, 332, and 334, for example. These scattering regions may be positioned with respect to each other in any suitable manner in a two-dimensional array. For example, as shown in FIG. 3, scattering regions 328, 330, 332, and 334 may be positioned adjacent one another in a two column by two row array (e.g., in the X-Y plane).

In some embodiments, beam steering module 324 associated with scattering module 326 may include two or more beam steering cells that may together steer incoming generated beam 323 from image generating module 322 towards one of the four scattering regions of scattering module 326. For example, as shown in FIG. 3, beam steering module 324 may include a first beam steering cell 336, a second beam steering cell 317, and a third beam steering cell 319. Image generating module 322 may direct a generated beam of light 323 towards first beam steering cell 336 of beam steering module 324. First beam steering cell 336 may receive generated beam 323 and may steer that beam 323 towards one of second beam steering cell 317 and third beam steering cell 319, which may be positioned adjacent one another along a first axis. For example, as shown in FIG. 3, second beam steering cell 317 and third beam steering cell 319 may be positioned adjacent one another along the Y-axis, and first beam steering cell 336 may steer received beam 323 either towards second beam steering cell 317 as a first steered beam 325 or towards third beam steering cell 319 as a second steered beam 327. Each one of the beams that may be steered by first beam steering cell 336 (e.g., steered beams 325 and 327) may be substantially identical to the generated beam 323 received at first beam steering cell 336 from image generating module 322.

If second beam steering cell 317 receives first steered beam 325 from first beam steering cell 336, second beam steering cell 317 may steer that beam 325 towards one of first scattering region 328 and second scattering region 330 of scattering module 326, which may be positioned adjacent one another along a second axis. For example, as shown in FIG. 3, first scattering region 328 and second scattering region 330 may be positioned adjacent one another along the X-axis, and second beam steering cell 317 may steer received beam 325 either towards first scattering region 328 as a steered beam 325' or towards second scattering region 330 as a steered beam 325". Each one of the beams that may be steered by second beam steering cell 317 (e.g., steered beams 325' and 325") may be substantially identical to the steered beam 325 received at second beam steering cell 317 from first beam steering cell 336. Likewise, if third beam steering cell 319 receives second steered beam 327 from first beam steering cell 336, third beam steering cell 319 may steer that beam 327 towards one of third scattering region 332 and fourth scattering region 334 of scattering module 326, which may be positioned adjacent one another along a second axis. For example, as shown in FIG. 3, third scattering region 332 and fourth scattering region 334 may also be positioned adjacent one another along the X-axis, and third beam steering cell 319 may steer received beam 327 either towards third scattering region 332 as a steered beam 327' or towards fourth scattering region 334 as a steered beam 327". Each one of the beams that may be steered by third beam steering cell 319 (e.g., steered beams 327' and 327") may be substantially identical to the steered beam 327 received at third beam steering cell 319 from first beam steering cell 336.

Figure 4:
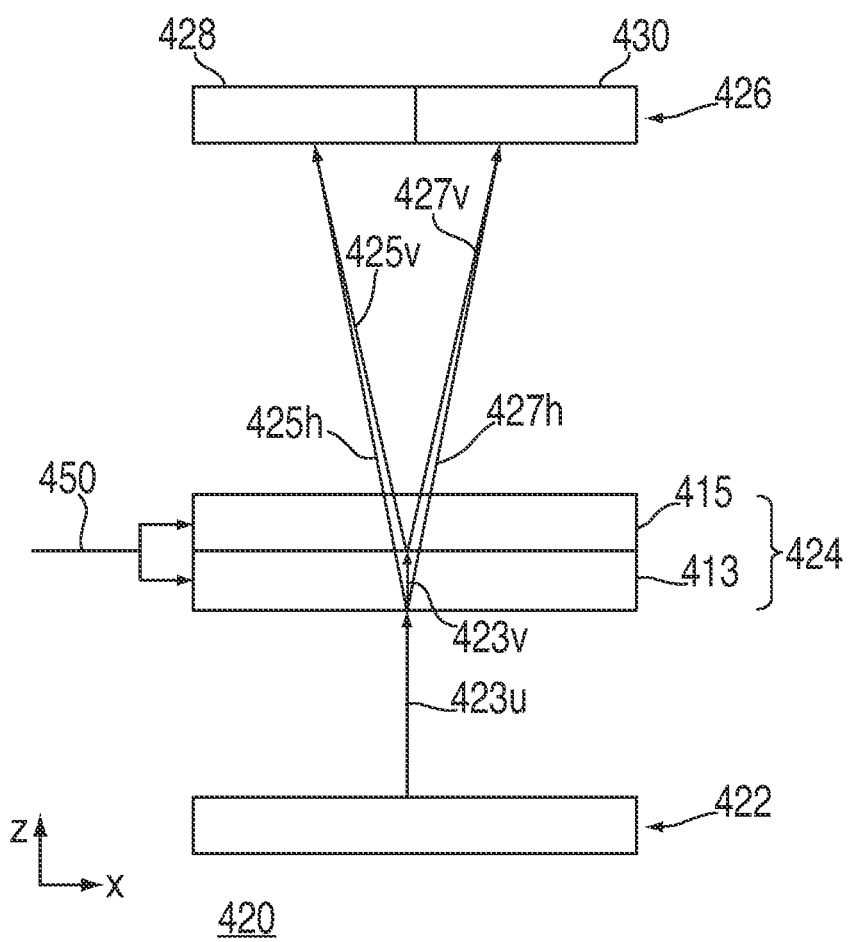
FIG. 4 is a side view of a display subassembly in accordance with some other embodiments of the invention.

While first beam steering cell 336 is shown in FIG. 3 to be spaced along axis Z from second beam steering cell 317 and third beam steering cell 319 in order to more clearly illustrate certain features, it is to be understood that the beam steering cells of steering module 324 may be positioned proximate to one another in some embodiments (e.g., as shown by steering cells 413 and 415 of steering module 424 of FIG. 4).

While only one control signal line 350, which may be substantially similar to control signal line 250 of FIG. 2B, is shown in FIG. 3 as being coupled to steering module 324 of display subassembly 320, the same control signal may be provided by control signal line 350 to each beam steering cell of steering module 324 or a different control signal may be provided by control signal line 350 to a respective one of the beam steering cells of steering module 324 for controlling the steering cells independently.

Once a steered beam is received at one of the scattering regions of scattering module 326, the scattering region may scatter the steered beam into a viewing cone 335 that may be defined by at least one viewing angle 337. Each viewing angle 337 that may at least partially define a viewing cone 335 may be dictated by one or more properties of the particular scattering region from which it was scattered. For example, one or more scattering regions of scattering module 326 (e.g., first scattering region 328, second scattering region 330, third scattering region 332, and fourth scattering region 334) may include different scattering properties than each of the other scattering regions of scattering module 326. As shown in FIG. 3, for example, first scattering region 328 may scatter steered beam 325' into a viewing cone 335-1, second scattering region 330 may scatter steered beam 325" into a viewing cone 335-2, third scattering region 332 may scatter steered beam 327' into a viewing cone 335-3, and fourth scattering region 334 may scatter steered beam 327" into a viewing cone 335-4, and each of these viewing cones 335 may be defined by at least one viewing angle that differs from a viewing angle that defines each one of the other viewing cones 335.

Figure 3A:
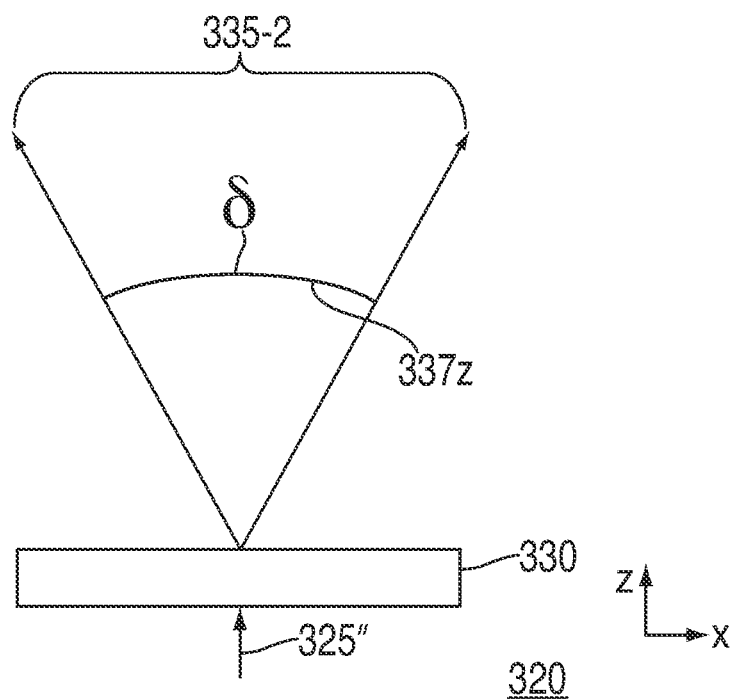
FIG. 3A is a side view of a portion of the display subassembly of FIG. 3, taken from line IIIA-IIIA of FIG. 3, in accordance with some embodiments of the invention.
Figure 3B:
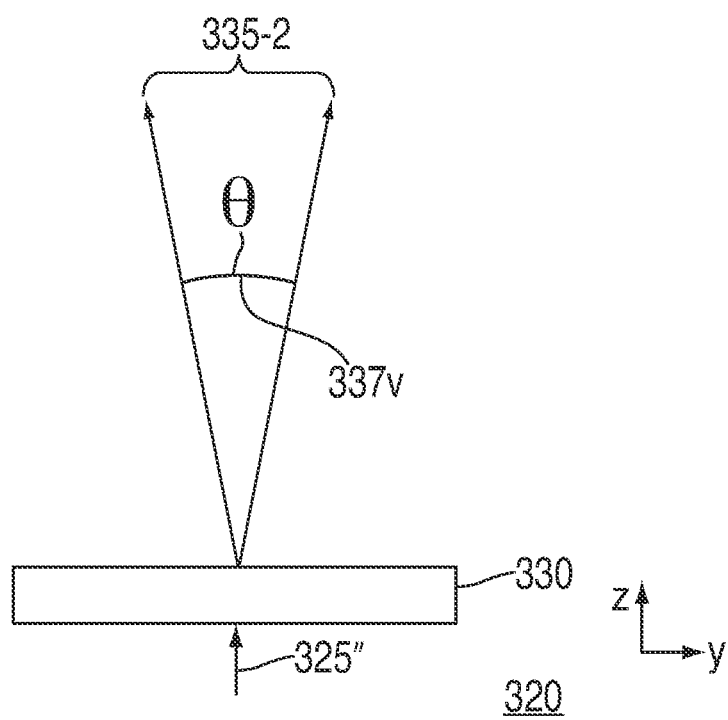
FIG. 3B is a side view of a portion of the display subassembly of FIGS. 3 and 3A, taken from line IIIB-IIIB of FIG. 3, in accordance with some embodiments of the invention.

In some embodiments, a viewing cone may be defined by two or more viewing angles. For example, as shown in FIGS. 3A and 3B, respectively, viewing cone 335-2 of second scattering region 330 of scattering module 326 may be defined by at least a horizontal viewing angle 337z with respect to the X-axis having a viewing angle size δ as well as a vertical viewing angle 337v with respect to the Y-axis having a viewing angle size θ, which may be any suitable viewing angle size that is larger or smaller than viewing angle size δ. Therefore, in such embodiments where viewing angle size δ is larger than viewing angle size θ, as shown in FIGS. 3-3B, viewing cone 335-2 may have a relatively wide horizontal viewing angle and a relatively narrow vertical viewing angle.

In some embodiments, each of the other viewing cones 335 of scattering module 326 may differ from one another such that scattering module 326 may provide a user with a suitable shaped viewing cone for any one of various applications. For example, in such embodiments where viewing angle size δ is larger than viewing angle size θ, viewing cone 335-1 may be defined by a relatively narrow horizontal viewing angle size θ and a relatively narrow vertical viewing angle size θ, viewing cone 335-2 may be defined by a relatively wide horizontal viewing angle size δ and a relatively narrow vertical viewing angle size θ (see, e.g., FIGS. 3A and 3B), viewing cone 335-3 may be defined by a relatively narrow horizontal viewing angle size θ and a relatively wide vertical viewing angle size δ, and viewing cone 335-4 may be defined by a relatively wide horizontal viewing angle size δ and a relatively wide vertical viewing angle size δ. Therefore, an electronic device provided with a display subassembly 320 may selectively generate a viewing cone 335 having a variable horizontal viewing angle and a variable vertical viewing angle to accommodate practically any situation.

In other embodiments, rather than including a single beam steering cell operative to steer an incoming beam towards a particular one of two or more scattering regions positioned adjacent one another along a particular axis (see, e.g., FIG. 2B), and rather than including two or more beam steering cells operative to steer an incoming beam to one of three or more scattering regions arranged in a two-dimensional array (see, e.g., FIG. 3), a scattering module receiving an unpolarized light beam may alternatively or additionally include beam steering cells that are operative to steer respective types of polarized light to one of two or more scattering regions of an associated scattering module. For example, as shown in FIG. 4, a display subassembly 420, which may be substantially similar to display subassemblies 220 of FIGS. 2B-2D and/or subassembly 320 of FIG. 3, may include a beam generating module 422, a beam steering module 424, and a beam scattering module 426. Beam generating module 422 may be operative to transmit a generated unpolarized light beam 423u towards beam steering module 424. Beam steering module 424 may include a first beam steering cell 413 and a second beam steering cell 415. These two beam steering cells may be positioned adjacent one another along the Z-axis of subassembly 420, for example. These two beam steering cells may be identical, but may be physically rotationally offset from one another about the Z-axis in the X-Y plane, such that one of the beam steering cells may be operative to steer the portion of unpolarized light beam 423u having a first polarization and such that the other one of the beam steering cells may be operative to steer the portion of unpolarized light beam 423u having a second polarization.

For example, as shown in FIG. 4, beam steering module 424 may include first beam steering cell 413 that may be configured to steer the portion of unpolarized light beam 423u having a first polarization (e.g., a horizontal polarization) towards one of the two or more scattering regions of associated scattering module 426 and that may be configured to pass the portion of unpolarized light beam 423u having a second polarization (e.g., a vertical polarization) towards second beam steering cell 415. In some embodiments, first beam steering cell 413 may be configured to steer a horizontal polarization light portion of unpolarized light beam 423u towards one of the two or more scattering regions of associated scattering module 426 (e.g., as first steered horizontal polarization beam 425h towards first scattering region 428 or as second steered horizontal polarization beam 427h towards second scattering region 430). First beam steering cell 413 may also be configured to pass a vertical polarization light portion of unpolarized light beam 423u towards second beam steering cell 415 (e.g., as vertical polarization beam 423v). Similarly, second beam steering cell 415 may be configured to steer vertical polarization beam 423v towards one of the two or more scattering regions of associated scattering module 426 (e.g., as first steered vertical polarization beam 425v towards first scattering region 428 or as second steered vertical polarization beam 427v towards second scattering region 430). Moreover, second beam steering cell 415 may be configured to pass the steered horizontal polarization beams 425h and 427h from first beam steering cell 413 towards scattering module 426.

While first beam steering cell 413 is shown in FIG. 4 to be positioned along axis Z proximate to second beam steering cell 415, it is to be understood that the beam steering cells of steering module 424 may be spaced apart from one another in some embodiments (e.g., as shown by steering cells 317 and 336 of steering module 324 of FIG. 3).

As shown in FIG. 4, second or vertical polarization beam steering cell 415 may be positioned adjacent first or horizontal polarization beam steering cell 413, along the Z-axis, between horizontal polarization beam steering cell 413 and scattering module 426. However, it is to be understood that, in other embodiments, second or vertical polarization beam steering cell 415 may instead be positioned adjacent horizontal polarization beam steering cell 413, along the Z-axis, between horizontal polarization beam steering cell 413 and image generating module 422, while horizontal polarization beam steering cell 413 may be positioned between vertical polarization beam steering cell 415 and scattering module 426. Moreover, it is to be understood that, in some embodiments, steering module 424 of subassembly 420 of FIG. 4 may not only be provided with first polarization beam steering cell 413 and second polarization beam steering cell 415, but steering module 424 may also be provided with one or more additional steering cells, such as steering cells 317, 319, and 326 of FIG. 3 for steering light beams (e.g., before or after polarization) to a two-dimensional array of scattering regions, for example.

While only one control signal line 450, which may be substantially similar to control signal line 250 of FIG. 2B and/or control signal line 350 of FIG. 3, is shown in FIG. 4 as being coupled to steering module 424 of display subassembly 420, the same control signal may be provided by control signal line 450 to each beam steering cell of steering module 424 or a different control signal may be provided by control signal line 450 to a respective one of the beam steering cells of steering module 424 for controlling the steering cells independently.

As mentioned, a beam steering module may include an electric field gradient or profile applied across one or more liquid crystal optical elements that may be under dynamic electronic control for steering incoming light towards one of two or more scattering regions of an associated scattering module. The electric field may vary across the beam steering module for steering an incoming light beam in various directions towards the scattering module. For example, the electric field gradient may be linear across the liquid crystal material of the beam steering module, such that incoming light may be steered to one of two or more scattering regions positioned adjacent one another along a particular axis (e.g., first scattering region 228 and second scattering region 230 of FIGS. 2B-2D along the X-axis, or third scattering region 332 and fourth scattering region 334 of FIG. 3 along the X-axis). In such embodiments, the linear gradient in the electric field of the liquid crystal optical elements across the beam steering module may function as an optical "wedge," such that an effective index of refraction of the steering module may be adjusted to provide a "beam steering" effect for a light beam towards one of two or more linearly aligned scattering regions of a scattering module.

Alternatively, the electric field gradient may extend radially away from an axis, across the liquid crystal material of the beam steering module, such that incoming light may be directed towards one of two or more concentric or otherwise radially spaced scattering regions of a scattering module. In such embodiments, the radial gradient in the electric field of the liquid crystal optical elements across the beam steering module may function as an optical "lens," such that a focal length of the steering module may be adjusted to provide a "focusing" effect for a light beam towards at least one of two or more radially spaced scattering regions of a scattering module.

Figure 5:
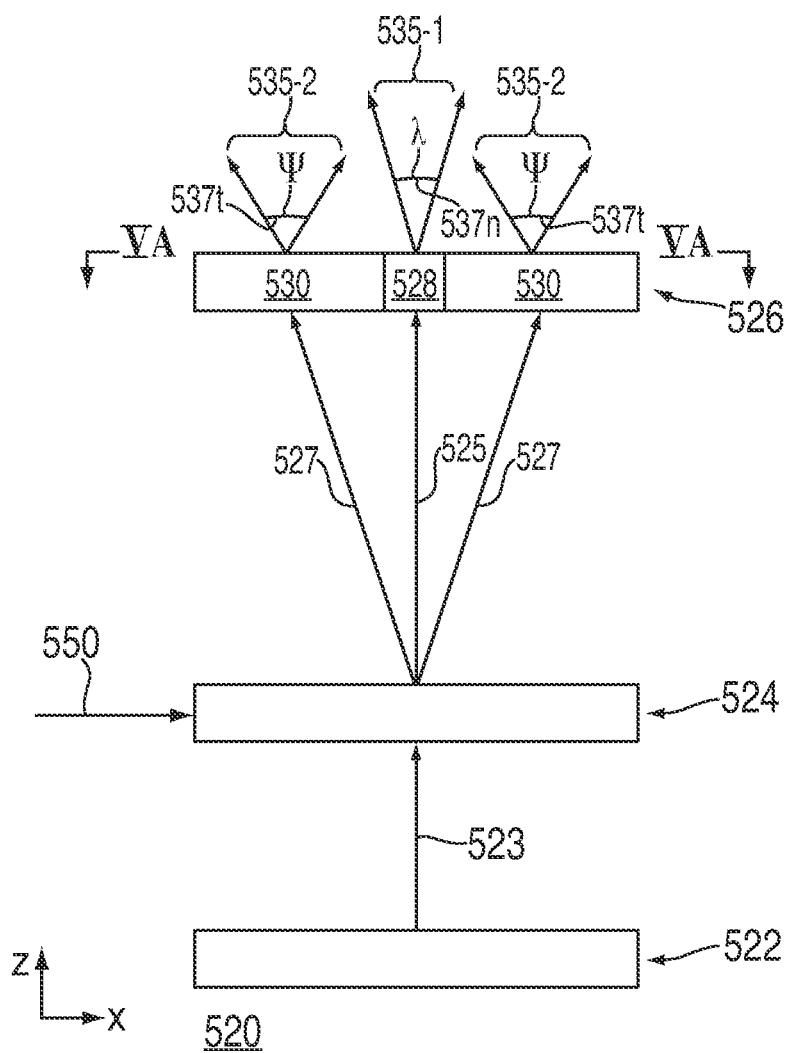
FIG. 5 is a side view of a display subassembly in accordance with yet some other embodiments of the invention.
Figure 5A:
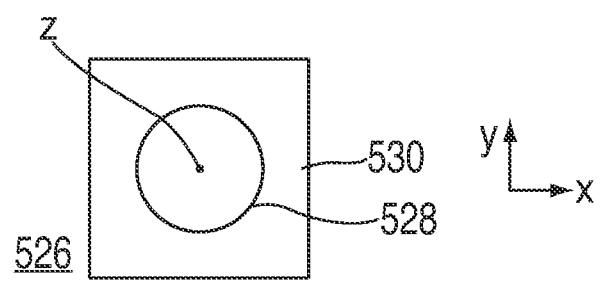
FIG. 5A is a top view of the display subassembly of FIG. 5, taken from line VA-VA of FIG. 5, in accordance with some embodiments of the invention.

For example, as shown in FIG. 5, a display subassembly 520, which may be substantially similar to display subassemblies 220 of FIGS. 2B-2D, subassembly 320 of FIG. 3, and/or subassembly 420 of FIG. 4, may include a beam generating module 522, a beam steering module 524, and a beam scattering module 526. Beam generating module 522 may be operative to transmit a generated light beam 523 towards beam steering module 524. Beam steering module 524 may include an electric field gradient or profile applied across one or more liquid crystal optical elements that may vary along beam steering module 524 radially away from the Z-axis under dynamic electronic control for directing incoming light beam 523 towards at least one of two or more scattering regions of associated scattering module 526. As shown in FIGS. 5 and 5A, for example, beam scattering module 526 may include two or more concentric or otherwise radially adjacent scattering regions, such as an inner scattering region 528 and an outer scattering region 530 that may at least partially surround inner scattering region 528 (e.g., about axis Z). Based on one or more received electronic control signals provided by control signal line 550, beam steering module 524 may steer or focus received beam 523 towards inner beam scattering region 528 as first steered beam 525 or towards outer beam scattering region 530 as one or more second steered beams 527. However, in some embodiments, when beam steering module 524 steers or focuses received beam 523 towards outer beam scattering region 530, some of received beam 523 may also be steered towards inner beam scattering region 528 as well.

Once a steered beam is received at one of the scattering regions of scattering module 526, the scattering region may scatter the steered beam into a viewing cone 535 that may be defined by at least one viewing angle 537. Each viewing angle 537 that may at least partially define a viewing cone 535 may be dictated by one or more properties of the particular scattering region from which it was scattered. For example, one or more scattering regions of scattering module 526 (e.g., inner scattering region 528 and outer scattering region 530) may include different scattering properties than each of the other scattering regions of scattering module 526. As shown in FIG. 5, for example, inner scattering region 528 may scatter steered beam 525 into a viewing cone 535-1, and outer scattering region 530 may scatter each steered beam 527 into a viewing cone 535-2. For example, viewing cone 535-1 of inner scattering region 528 may be defined by at least a horizontal viewing angle 537$n$ with respect to the X-axis having a viewing angle size λ, and at least one viewing cone 535-2 of outer scattering region 530 may be defined by at least a horizontal viewing angle 537$t$ with respect to the X-axis having a viewing angle size ψ, which may be any suitable viewing angle size that is larger or smaller than viewing angle size λ. Therefore, in such embodiments where viewing angle size λ is smaller than viewing angle size ψ, as shown in FIG. 5, viewing cone 535-1 may have a relatively narrow horizontal viewing angle and viewing cone 535-2 may have a relatively wide horizontal viewing angle.

Whether an electric field gradient or profile varies linearly, radially, or in any other suitable manner across the liquid crystal optical elements of a beam steering module, the gradient may be continuous or may be provided in distinct regions. Similarly, whether a beam scattering module includes two or more linearly aligned scattering regions, three or more scattering regions positioned in a two-dimensional array, two or more concentric or otherwise radially adjacent scattering regions, or any other suitable arrangement of scattering regions, the scattering properties of two adjacent scattering regions may gradually blend with one another or they may abruptly change at the portion of the scattering module where the two scattering regions meet.

In some embodiments, a display assembly may include a first subset of display subassemblies that may each include a scattering module having only two scattering regions, while a second subset of the display subassemblies may each include a scattering module having three or more scattering regions. Therefore, such a display assembly may be able to provide viewing cones with different possible viewing angles at different portions of the array of subassemblies. While each viewing angle of each viewing cone illustrated in FIGS. 2B-5 is shown to be symmetrical about an axis substantially perpendicular to the display screen (e.g., symmetrical about the Z-axis), it is to be understood that a scattering region may be operative to scatter light into a viewing cone with at least one viewing angle that is not symmetrical about an axis substantially perpendicular to the display screen.

Each display subassembly may be associated with a respective subpixel, a respective pixel, a respective triad of pixels, or any other respective image element of the display assembly. Moreover, the steering and scattering capabilities of each subassembly may be performed on a light beam at various stages of conditioning for presentation to a user. For example, with reference to a display subassembly 220 of FIG. 2B, each image generating module 222 may include a light generating component (e.g., a backlight) and one or more light conditioning components (e.g., one or more optical filters that may be under electronic control, such as a polarization filter, one or more shutters, and/or one or more colored filters for creating an image from the generated light). In such embodiments, a generated light beam 223 provided by an image generating module 222 may be steered, scattered, and then presented to a user without any additional optical filtering or conditioning.

Alternatively, with continued reference to a display subassembly 220 of FIG. 2B, each image generating module 222 may include a light generating component, and a separate light conditioning component 222' may be positioned elsewhere in the subassembly 220 to provide optical filtering before presenting a light beam to a user. For example, as shown in FIG. 2B, a separate light conditioning component 222' may be positioned in a subassembly 220 adjacent the beam scattering module 226 and between the scattering module 226 and a user, such that a scattered beam may be optically filtered before being presented to the user. As another example, a separate light conditioning component 222'' may be positioned in a subassembly 220 (see, e.g., subassembly 220b) between the beam steering module 224 and the beam scattering module 226, such that a steered beam may be optically filtered before being scattered. In some embodiments, a single light guide pipe or any other suitable light generating assembly may be provided as the light generating component for two or more of the display subassemblies.

In some embodiments, the brightness or peak white level of the generated light beam 223 provided by the beam generating module of a particular subassembly 220 may be varied based on the viewing angle of its associated scattered beam provided by the scattering region 226 of that subassembly 220. For example, in order to conserve power, when a smaller viewing angle is used for a light beam of a particular subassembly 220 (e.g., viewing angle size α by controlling beam steering module 224 to steer generated light beam 223 to first beam scattering region 228), the brightness of generated light beam 223 for that subassembly may be reduced. However, when a larger viewing angle is used for a light beam of a particular subassembly 220 (e.g., viewing angle size β by controlling beam steering module 224 to steer generated light beam 223 to second beam scattering region 230), the brightness of generated light beam 223 for that subassembly may be increased. For example, balancing the brightness of a generated light beam 223 with the selected viewing angle for that beam may provide a constant perceived brightness of the beam by one or more observers while conserving the power of device 200.

In some embodiments, as shown in FIG. 2B, for example, display assembly 212 may also include a screen 240 that may be positioned between beam scattering modules 226, or separate light conditioning component 222', and the exterior of device 200 (e.g., user 290). For example, this screen 240 may provide additional protection to display assembly 212.

Figure 6:
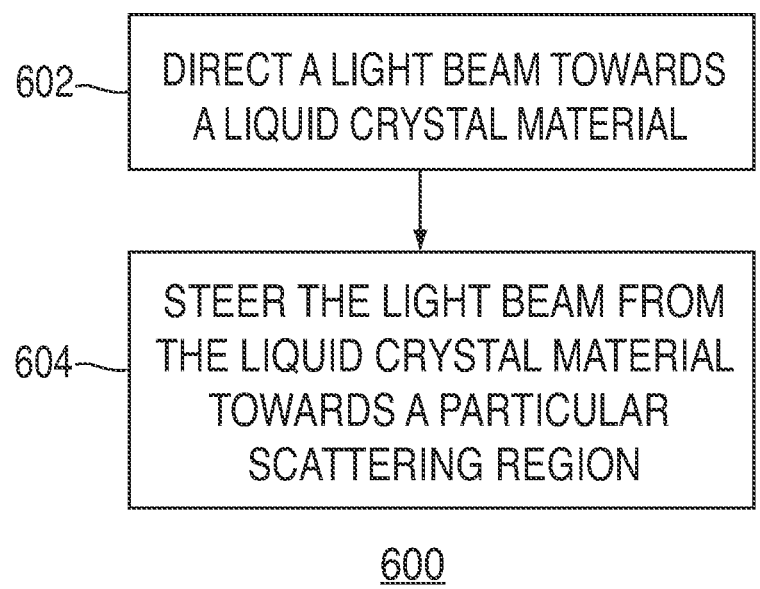
FIG. 6 is a flowchart of an illustrative process for controlling a viewing angle of a display in accordance with some embodiments of the invention.

FIG. 6 is a flowchart of an illustrative process 600 for controlling a viewing angle of a display. The display may include a first scattering region with first scattering properties and a second scattering region with second scattering properties.

At step 602, a light beam may be directed towards a liquid crystal material. For example, the light beam may be generated by an image generating component (e.g., image generating component 222) or otherwise directed towards a beam steering module including a liquid crystal material. Next, at step 604, the light beam may be steered from the liquid crystal material towards a particular scattering region of the first scattering region and the second scattering region.

For example, the steering at step 604 may include applying a variable electrical control signal to the liquid crystal material. In some embodiments, an effective index of refraction of the liquid crystal material may be adjusted using the applied control signal. In other embodiments, a focal length of the liquid crystal material may be adjusted using the applied control signal. Process 600 may also include adjusting the brightness of the light beam based on the scattering properties of the particular scattering region. For example, by balancing the brightness of a generated light beam with the selected viewing angle for that beam, a constant perceived brightness by one or more observers of that beam may be provided while conserving power. The steering at step 604 may not include any mechanical movement of the liquid crystal material.

It is understood that the steps shown in process 600 of FIG. 6 are merely illustrative and that existing steps may be modified or omitted and that additional steps may be added.

While there have been described systems and methods for electronically controlling the viewing angle of a display screen, it is to be understood that many changes may be made therein without departing from the spirit and scope of the invention. It is also to be understood that various directional and orientational terms, such as "top" and "bottom," "horizontal" and "vertical," and the like, are used herein only for convenience, and that no fixed or absolute directional or orientational limitations are intended by the use of these words. For example, the displays of the invention can have any desired orientation. If reoriented, different directional or orientational terms may need to be used in their description, but that will not alter their fundamental nature as within the scope and spirit of the invention.

Those skilled in the art will appreciate that the invention can be practiced by other than the described embodiments, which are presented for purposes of illustration rather than of limitation.

What is claimed is:

1. An electronic device comprising:
a housing comprising an opening through a portion of the housing;

a light source that directs light towards the opening; and
a first display control subassembly comprising:
  a scattering module positioned between the light source and the opening, the scattering module comprising a plurality of scattering regions; and
  a steering module positioned between the light source and the scattering module, the steering module comprising:
    a first beam steering cell positioned between the light source and the scattering module;
    a second beam steering cell positioned between the first beam steering cell and the scattering module; and
    a third beam steering cell positioned between the first beam steering cell and the scattering module, wherein:
      the first beam steering cell comprises a liquid crystal material that is electronically controllable by a first control signal to direct a light beam from the light source towards the second beam steering cell when the first control signal is a first value and towards the third beam steering cell when the first control signal is a second value;
      the second beam steering cell is electronically controllable by a second control signal to direct a light beam from the first beam steering cell towards a first scattering region of the plurality of scattering regions when the second control signal is a third value and towards a second scattering region of the plurality of scattering regions when the second control signal is a fourth value;
      the third beam steering cell is electronically controllable by a third control signal to direct a light beam from the first beam steering cell towards a third scattering region of the plurality of scattering regions when the third control signal is a fifth value and towards a fourth scattering region of the plurality of scattering regions when the third control signal is a sixth value;
      the first value is different than the second value;
      the first scattering region comprises a first scattering property;
      the second scattering region comprises a second scattering property;
      the first scattering property is different than the second scattering property;
      the scattering module and the steering module are positioned along a first axis;
      the first scattering region and the second scattering region are positioned along a second axis perpendicular to the first axis; and
      the first scattering region and the third scattering region are positioned along a third axis that is perpendicular to both the first axis and the second axis.

2. The electronic device of claim 1, wherein:
the first scattering region scatters light from the steering module towards the opening with a first viewing angle with respect to the first axis; and
the second scattering region scatters light from the steering module towards the opening with a second viewing angle with respect to the first axis, wherein the second viewing angle is different than the first viewing angle.

3. The electronic device of claim 1, wherein the steering module comprises a linear electric field gradient across the liquid crystal material.

4. The electronic device of claim 1, wherein the liquid crystal material is electronically controllable to adjust an effective index of refraction of the steering module.

5. The electronic device of claim 1, wherein the liquid crystal material is electronically controllable to adjust a focal length of the steering module.

6. The electronic device of claim 1 further comprising a light conditioning component positioned between the light source and the steering module.

7. The electronic device of claim 1 further comprising a light conditioning component positioned between the steering module and the scattering module.

8. The electronic device of claim 1 further comprising a light conditioning component positioned between the scattering module and the opening.

9. The electronic device of claim 1, wherein at least one scattering region of the plurality of scattering regions scatters light towards the opening in a viewing cone comprising a first viewing angle with respect to the second axis and a second viewing angle with respect to the third axis, and wherein:
the second viewing angle is different than the first viewing angle.

10. The electronic device of claim 1 further comprising a second display control subassembly positioned adjacent the first display control subassembly.

11. The electronic device of claim 10, wherein the second display control subassembly comprises:
  a second scattering module positioned between the light source and the opening, the second scattering module comprising a second plurality of scattering regions; and
  a second steering module positioned between the light source and the second scattering module, the second steering module comprising a second liquid crystal material that is electronically controllable to direct a second light beam from the light source towards a particular scattering region of the second plurality of scattering regions.

12. The electronic device of claim 11, further comprising a processor configured to generate at least the first control signal and another control signal, wherein:
the liquid crystal material of the steering module of the first display control subassembly is electronically controllable by at least the first control signal provided by the processor to the steering module on a first control signal line;
the second liquid crystal material of the second steering module of the second display control subassembly is electronically controllable by at least the other control signal provided by the processor to the second steering module on a second control signal line; and
the first control signal is independent from the other control signal.

13. The electronic device of claim 1, wherein:
the third value is different than the fourth value;
the third scattering region comprises a third scattering property;
the fourth scattering region comprises a fourth scattering property;
the third scattering property is different than each one of the first scattering property, the second scattering property, and the fourth scattering property;
the fourth scattering property is different than each one of the first scattering property, the second scattering property, and the third scattering property;
the scattering module and the steering module are positioned along a first axis; and the third scattering region and the fourth scattering region are positioned along a fourth axis parallel to the second axis.

* * * * *